United States Patent [19]

Hall

[11] 4,178,578

[45] Dec. 11, 1979

[54] PEST CONTROL APPARATUS

[75] Inventor: Lester B. Hall, 249 Kinsey Ave., Kenmore, N.Y. 14217

[73] Assignee: Gary Lester Hall, Kenmore, N.Y.

[21] Appl. No.: 840,536

[22] Filed: Oct. 11, 1977

[51] Int. Cl.² .......................................... H04B 11/00
[52] U.S. Cl. ...................................... 367/139; 43/124
[58] Field of Search ................. 340/15, 384 E; 43/124

[56] References Cited

U.S. PATENT DOCUMENTS

| | | | |
|---|---|---|---|
| 3,328,908 | 7/1967 | Moe | 340/15 X |
| 3,517,226 | 6/1970 | Jones, Sr. | 340/15 X |
| 3,636,559 | 1/1972 | Grande et al. | 340/384 E |
| 3,872,472 | 3/1975 | Moschgat | 340/15 X |
| 3,879,702 | 4/1975 | Mancone | 340/15 |

Primary Examiner—Theodore M. Blum
Attorney, Agent, or Firm—Christel, Bean & Linihan

[57] ABSTRACT

Ultrasonic pest control apparatus comprising a pair of transducers, one in the form of a ring and the other in the form of a disc positioned within the ring, carried by a housing, a pair of oscillators operatively connected to the transducers, a timer controlling the oscillators, and a reflector extending from the housing. The oscillators apply to the transducers electrical signals having frequencies different from the natural frequencies of the transducers, and the timer controls the oscillator duty cycle. The generated sound waves are a composite output in the form of a random pattern of harmonics in the ultrasonic frequency range noramlly inaudible to humans and intolerable by pests such as rodents. A system includes a pair of units in opposed alignment whereby sound waves of one unit work against sound waves of the other. A gas-tight sealing arrangement associated with transducer and housing permits safe operation in explosive atmospheres. The transducers, oscillators and timer are removable as a unit from the housing which is frusto-conical in shape permitting a plurality of units to be nested during storage and shipment.

19 Claims, 13 Drawing Figures

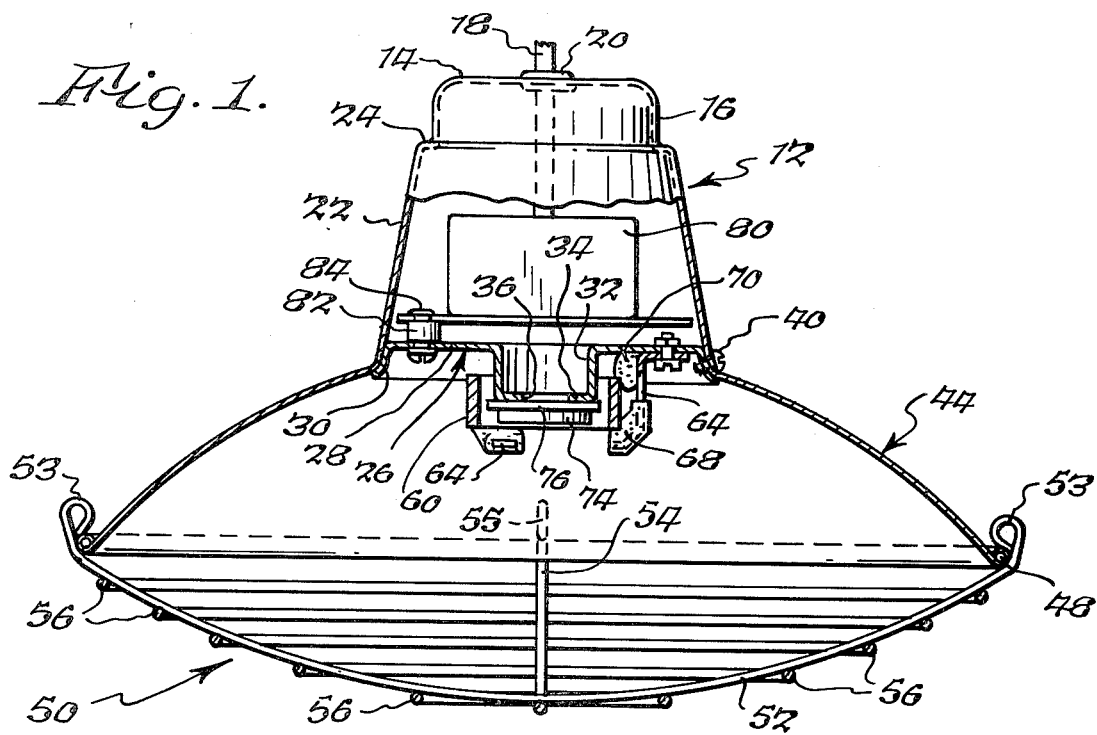
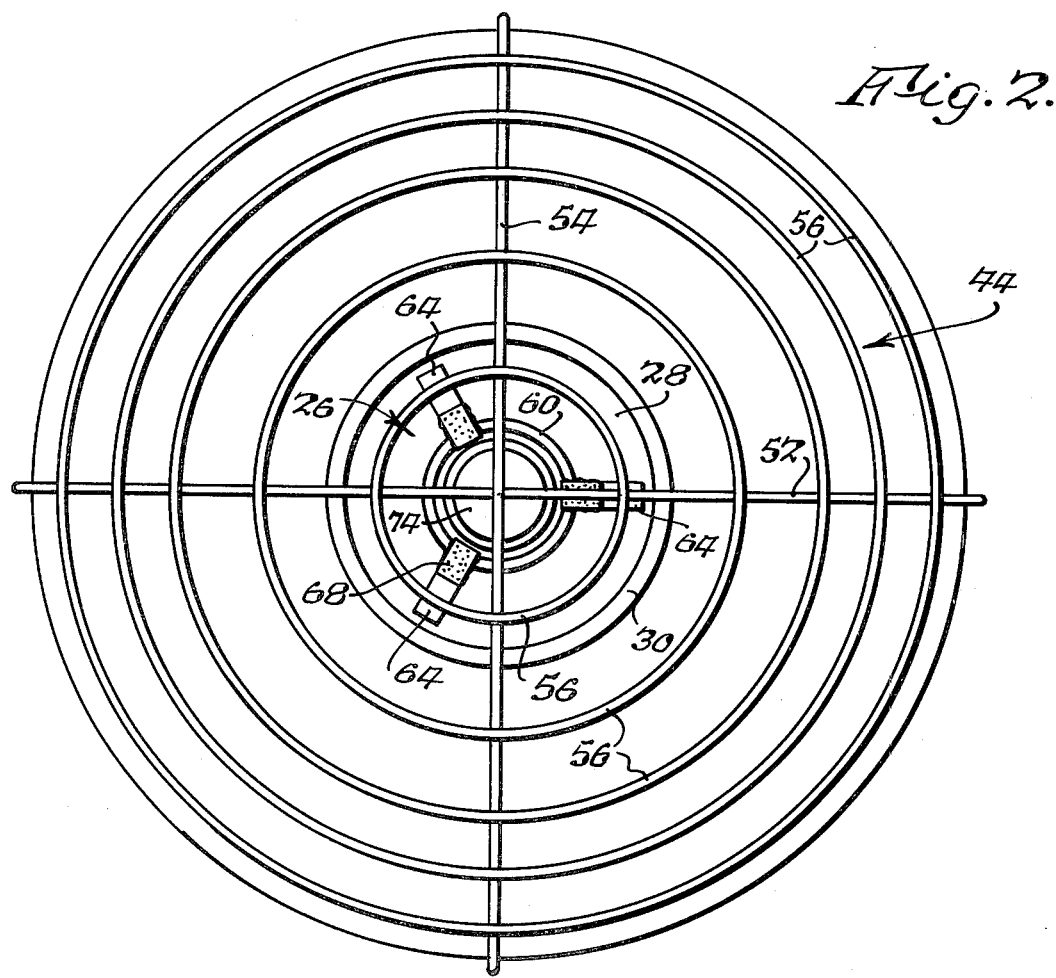

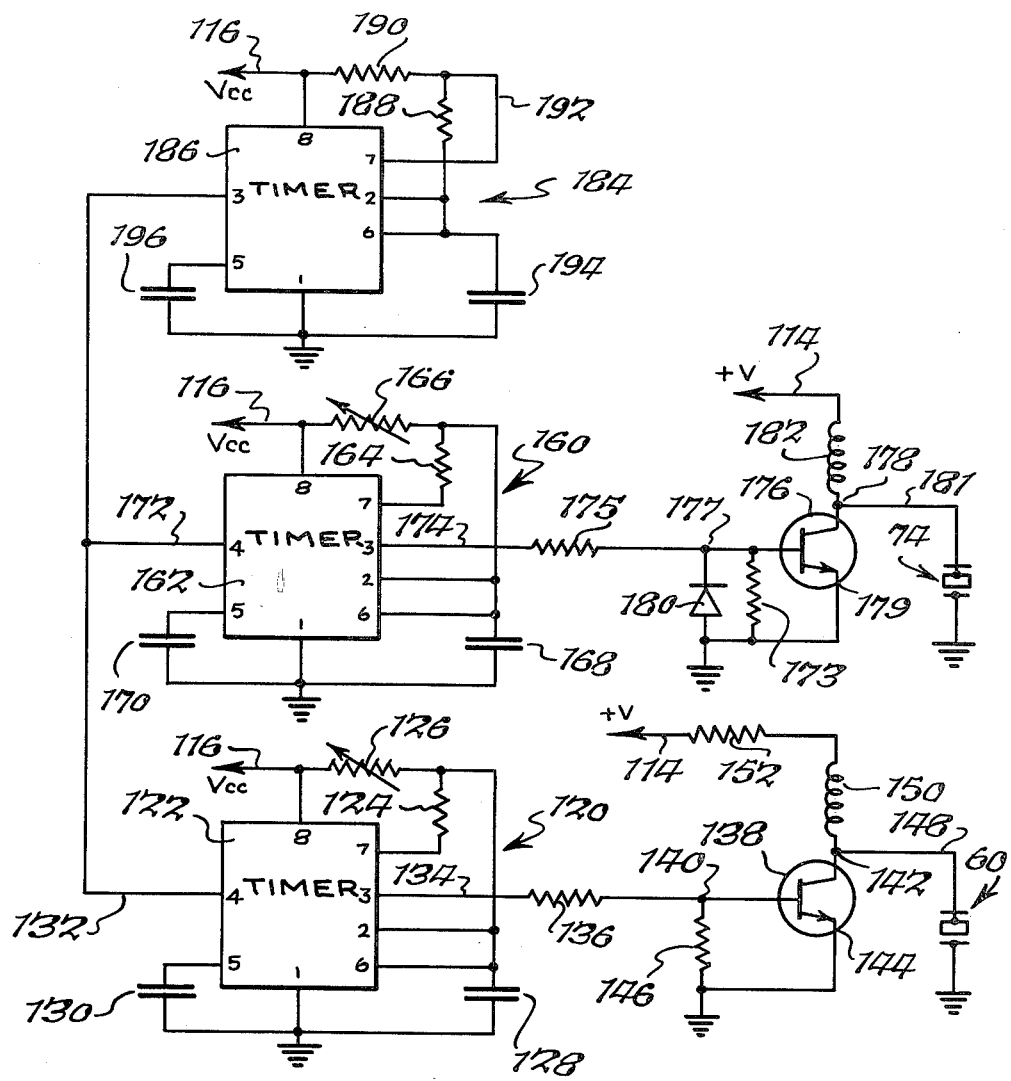
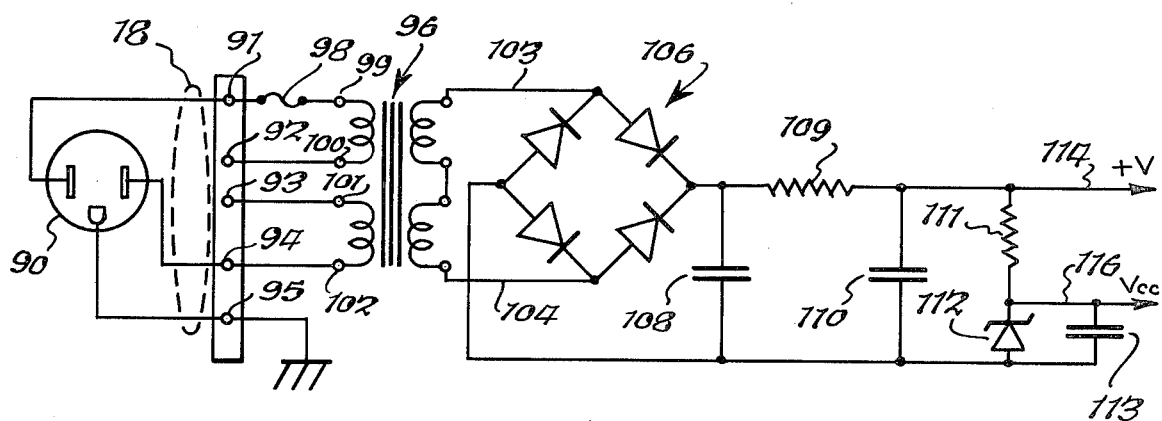
Fig. 3.

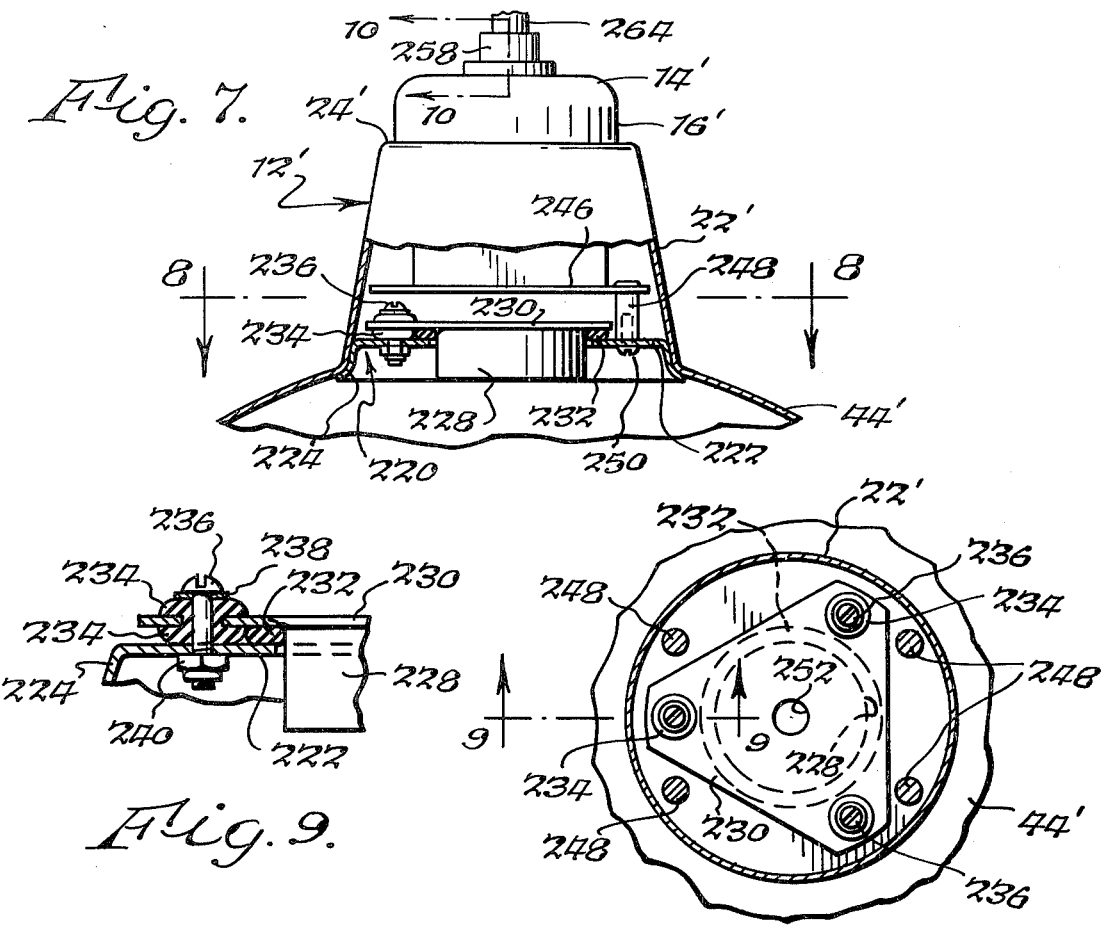
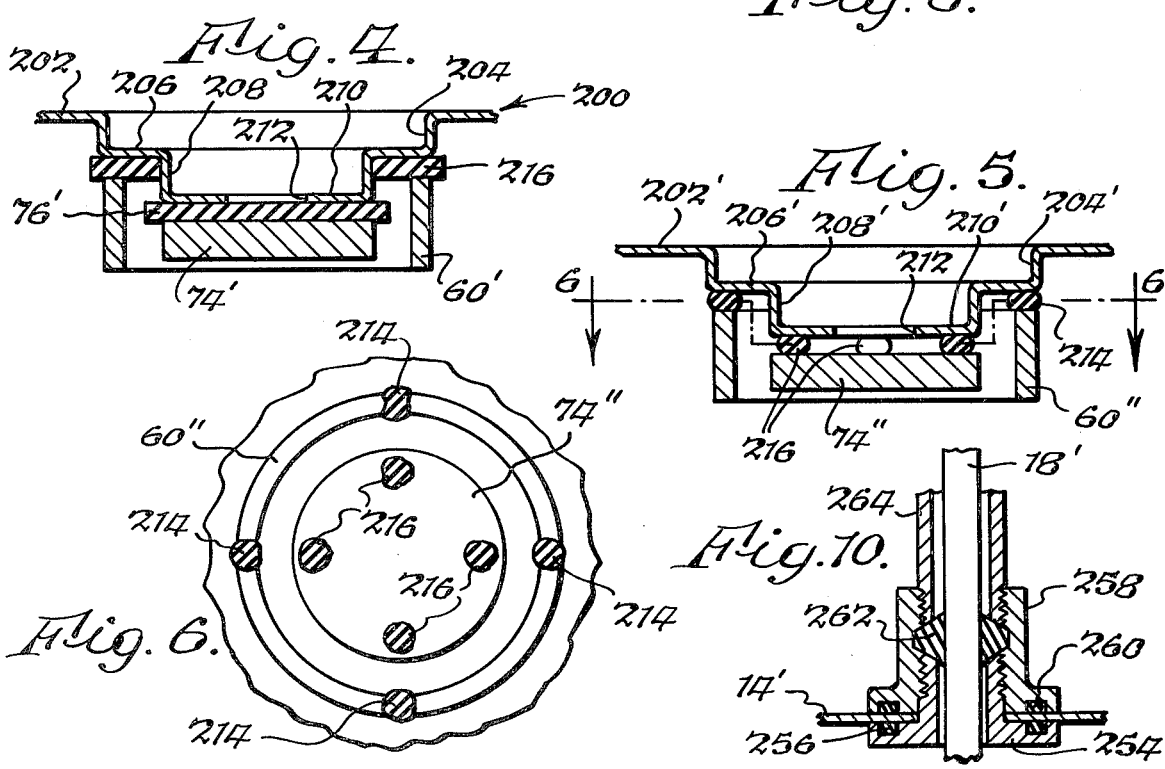

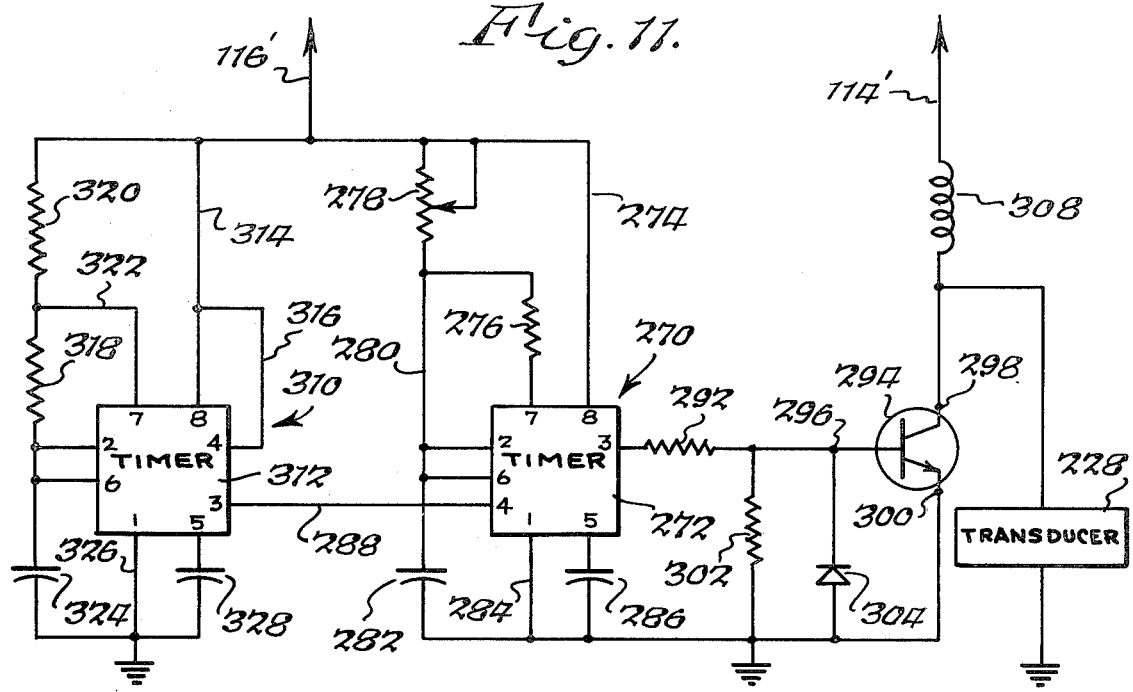
Fig. 11.
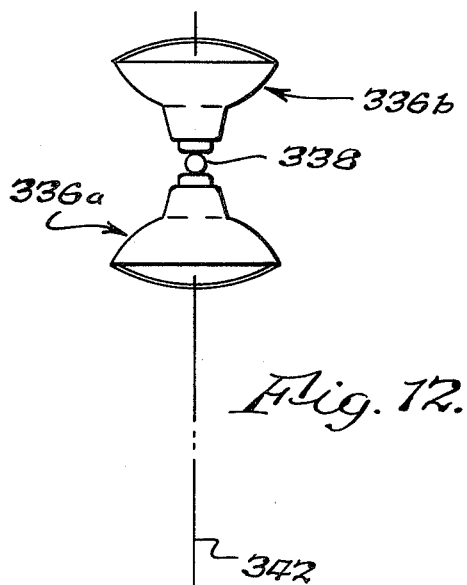
Fig. 12.
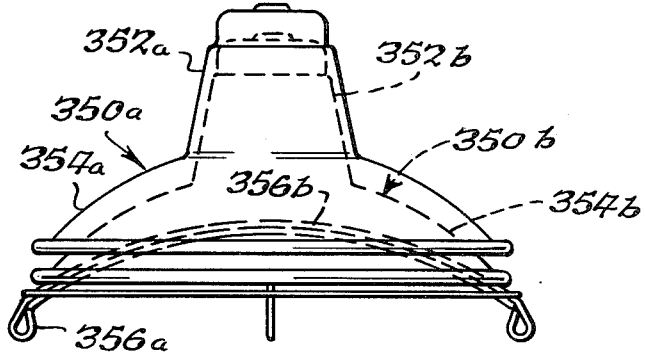
Fig. 13.
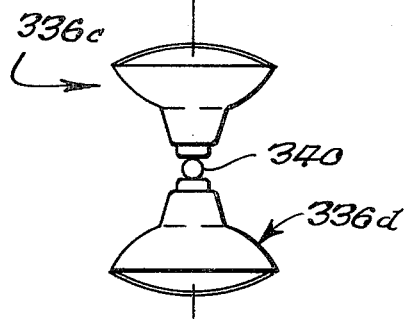

PEST CONTROL APPARATUS

BACKGROUND OF THE INVENTION

This invention relates to the art of controlling pests such as rodents and the like, and more particularly to a new and improved apparatus for generating and radiating ultrasonic sound waves for controlling such pests.

It has been discovered that ultrasonic sound waves at a frequency normally inaudible to humans can be effective to repel pests such as rodents and the like. In the design of apparatus for generating and radiating ultrasonic sound waves for controlling such pests, there are a number of important factors to be considered. The sound waves should be emitted in a manner providing maximum stress and irritation to the pests while at the same time being consistent with human safety. It would be highly desirable to provide such apparatus wherein the output sound waves are of a nature which the pests never can become accustomed to. Such apparatus should be convenient and easy to store and transport and to install in a wide variety of locations and be operable from 120 volt and 240 volt electrical lines in a manner using low power. In addition, it would be highly desirable to provide such apparatus which while being electrically operated is safely usable in explosive and flammable atmospheres.

SUMMARY OF THE INVENTION

It is, therefore, an object of this invention to provide a new and improved apparatus for generating and radiating ultrasonic sound waves for the control of pests such as rodents and the like.

It is a further object of this invention to provide such apparatus wherein the generated and radiated ultrasonic sound waves are more disturbing and irritating to such pests than heretofore obtainable.

It is a further object of this invention to provide such apparatus wherein the generated and radiated sound waves are of a nature such that the pests never can become accustomed or immune to such sound waves.

It is a further object of this invention to provide such apparatus which is convenient and easy to store and transport and to install in a variety of locations.

It is a further object of this invention to provide such apparatus which is safely usable in explosive and flammable atmospheres.

It is a further object of this invention to provide such apparatus which is relatively simple in construction and economical to manufacture and use.

The present invention provides apparatus for generating and radiating ultrasonic sound waves for the control of pests such as rodents and the like including sound generating means for providing a composite output of sound waves in the form of a random pattern of harmonics in the ultrasonic range at frequencies normally inaudible to humans and intolerable by such pests, and a reflector operatively associated with the sound generating means and positioned relative thereto in a manner providing directional concentration of the output sound waves. The sound generating means can comprise a pair of transducers each having a natural frequency of oscillation, oscillator means for applying electrical signals to the transducers wherein the signal frequencies are different from the transducer natural frequencies, and timing means for controlling the duty cycle of the oscillator means. One transducer can be in the form of a ring, the other can be in the form of a disc located within the ring and both transducers can be carried by a supporting element in a manner allowing a limited degree of movement of the transducers. Two separate units of apparatus can comprise a system wherein the two units are in spaced-apart alignment each radiating toward the other causing the sound waves of one to work against the sound waves of the other. In another form of the apparatus, a single transducer operated in a manner similar to the foregoing two transducer apparatus is carried by a housing, and a gas-tight seal is associated with the transducer and housing rendering the apparatus safely operable in explosive and flammable atmospheres. The transducers, oscillators and timer can be removably carried by a housing having a shape which in combination with the shape of the reflector permits nesting of a plurality of apparatus units for convenience in storage and transportation.

The foregoing and additional advantages and characterizing features of the present invention will become clearly apparent upon a reading of the ensuing detailed description wherein:

BRIEF DESCRIPTION OF THE DRAWING FIGURES

FIG. 1 is a side elevational view with parts removed and some parts in section of apparatus for generating and radiating ultrasonic sound waves for controlling pests in accordance with the present invention;

FIG. 2 is a plan view of the apparatus of FIG. 1;

FIG. 3 is a schematic circuit diagram of the sound generating means of the apparatus of FIG. 1;

FIG. 4 is a sectional view of an alternative transducer mounting arrangement for the apparatus of FIG. 1;

FIG. 5 is a sectional view of another alternative transducer mounting arrangement for the apparatus of FIG. 1;

FIG. 6 is a sectional view taken about on line 6—6 in FIG. 5;

FIG. 7 is a fragmentary elevational view, partly in section, illustrating apparatus according to another embodiment of the present invention;

FIG. 8 is a sectional view taken about on line 8—8 in FIG. 7;

FIG. 9 is a sectional view taken about on line 9—9 in FIG. 8;

FIG. 10 is a sectional view taken about on line 10—10 in FIG. 7;

FIG. 11 is a schematic circuit diagram of the sound generating means of the apparatus of FIG. 7;

FIG. 12 is a diagrammatic view illustrating a pest control system according to the present invention; and FIG. 13 is a side elevational view, partly diagrammatic, illustrating a nested arrangement of two units of apparatus according to the present invention.

DETAILED DESCRIPTION OF THE ILLUSTRATED EMBODIMENTS

In prior art apparatus for generating and radiating ultrasonic sound waves for the control of pests such as rodents and the like, a single transducer is carried by a housing having a reflector fixed to one end of the housing, and an oscillator connected to the transducer applies to the transducer an electrical signal having a frequency equal to the natural frequency of oscillation of the transducer for producing ultrasonic sound waves normally inaudible to humans and irritating to the pests. In the apparatus according to the present invention, two transducers each having a natural frequency of oscillation are carried by a supporting element, and a driving means comprising a pair of oscillators operatively connected to corresponding ones of the transducers also is carried by the supporting element. The oscillators apply to each transducer an electrical signal having a frequency different from the natural frequency of the transducer, and the driving means also includes timing means controlling the duty cycle of the oscillators. As a result, the transducers provide a composite output in the form of a random pattern of harmonics in the ultrasonic frequency range normally inaudible to humans and intolerable by such pests. The apparatus also includes a reflector extending from the supporting element and positioned relative to the transducers in a manner providing directional concentration of the output sound waves.

One of the transducers can be in the form of a ring and the other transducer in the form of a disc located within the ring, and the transducers can be mounted to the supporting element in a manner allowing a limited degree of relative movement. The apparatus can include one transducer having a natural frequency of oscillation, an oscillator applying to the transducer an electrical signal having a frequency different from the transducer natural frequency, and timing means controlling the oscillator duty cycle. This form of the apparatus can be provided with a gas-tight seal associated with the transducer and housing enabling the apparatus to be safely used in explosive and flammable atmospheres. Two separate units of the apparatus can comprise a system wherein the two units are in spaced-apart alignment each radiating toward the other causing the sound waves of one to work against the sound waves of the other. The transducers, oscillators and timer can be removably carried by a housing having a frusto-conical shape which in combination with the shape of the reflector permits nesting of a plurality of units of apparatus for convenience in storage and shipment.

FIG. 1 shows pest control apparatus according to the present invention including a housing generally designated 12 having a cup-shaped end portion including an end wall 14 and a generally cylindrical side wall 16 extending axially therefrom for a relatively short distance compared to the overall axial length of housing 12. End wall 14 and side wall portion 16 meet at a rounded annular junction surface. End wall 14 is provided with an opening generally centrally thereof for allowing passage therethrough of an insulated electrical conductor 18 for supplying electrical power to the apparatus in a manner which will be described. Conductor 18 is received in the opening by a bushing element 20. Housing 12 further comprises a frusto-conical wall portion 22 extending along a major portion of the axial length of housing 12. Wall portion 22 meets the relatively short cylindrical wall portion 16 in an annular edge 24 defining a shoulder which is disposed in a plane substantially perpendicular to the longitudinal axis of housing 12. The diameter of wall portion 22 increases in an axial direction away from the wall portion 16. In addition, the diameter of end wall 14 plus the relatively short axial length of portion 16 are of such size relative to the smaller diameter end of frusto-conical portion 22 that if the outer surface portion 22 were extended in an opposite axial direction it would include or encompass the portion including end wall 14 and side wall portion 16.

The end of housing 12 axially opposite wall 14 receives an element designated 26 which closes the interior of housing 12 and serves as a base or supporting means for other components of the system in a manner which will be described. The element 26 includes a main body portion 28 which is planar, somewhat disc-shaped, and which is formed to include a circumferential annular rim or flange 30 having an outer surface shaped to conform to the inner surface portion of frusto-conical wall 22 adjacent the opening thereof in which element 26 is received. The element is provided with a central cylindrical extension 32 extending axially from the base 28 in the same axial direction as the flange 30 extends, the extension 32 being of greater axial length. The extension 32 terminates in a radial inward flange portion 34 having a central opening 36 therein. The element 26 is joined to the housing 12 by removable fastener means, one of which is shown as the screw 40, whereby the element 26 and components carried thereby can be transported separately from housing 12 and quickly and easily joined thereto when the apparatus is installed in a manner which will be described.

The apparatus further comprises a reflector 44 extending from housing 12 and from the element 26. In particular, reflector 44 is solid or continuous and of concave shape, somewhat dish-shaped, wherein the smaller diameter end coincides substantially with the maximum diameter of housing wall portion 22 and substantially with the maximum diameter of element 26. Reflector 44 has an outer, larger diameter end located axially away from housing 12, which in the apparatus shown is circular having a diameter coinciding with the longitudinal axis of housing 12. In the apparatus shown, reflector 44 and the frusto-conical housing wall 22 are integral, being shaped or otherwise formed from the same material. The material reflector 44 is selected to have high acoustic reflection properties, and one material found to perform satisfactorily is spun aluminum. In addition, the reflector and housing can be provided with a chromic acid anodized finish. The edge of reflector 44 defining the larger diameter end is rolled or otherwise formed to provide an annular bead formation 48. Reflector 44 and housing 12 have a common longitudinal axis.

Associated with reflector 44 is a protective grill or grid 50 which in the device shown is removably attached to reflector 44 over the open end thereof. In particular, grill 50 is formed by a first rod 52 of metal such as steel or other suitable material having an arcuate shape and provided with hook-like terminations 53 at opposite ends which are formed to be snap-fit onto the reflector bead 48 at diametrically opposite locations. Similarly, another rod element 54 of similar material and arcuate shape is disposed perpendicular to rod 52 and is provided with hook-like terminations at opposite ends, one of which is shown at 55 in FIG. 2, which likewise snap-fit over reflector bead 48 at diametrically opposite locations. The rods 52, 54 are joined such as by welding at their intersection. The grid 50 further comprises a series of concentric circular rod elements 56 of similar material which are carried by the rods 52, 54, being welded to the outer surfaces thereof. The grill 50 can of course have other forms and configurations. Furthermore, the grill 50 can be provided with removable fastening means, for example brackets associated with the four ends of the rods 52, 54 which can be screwed or bolted to reflector 44 in a suitable manner.

The apparatus of the present invention further comprises first transducer means in the form of a ring 60 carried by the supporting element 26 and having a natural frequency of oscillation. Transducer 60 functions to provide output sound waves in the ultrasonic range when energized by an appropriate electrical signal in a manner which will be described in detail presently. The annular-shaped transducer 60 is disposed with the longitudinal axis thereof generally coincident with the common longitudinal axis of housing 12 and reflector 44. Transducer 60 is located on side of supporting element 26 facing reflector 44, and in the apparatus shown transducer 60 is generally concentric with respect to extension 32. In addition, transducer 60 is movably carried by the supporting element 26 in a manner allowing a limited degree of movement in axial direction. In particular, the mounting means for transducer 60 comprises a plurality of bracket arms, in the present illustration three, each designated 64 in FIGS. 1 and 2. In the apparatus shown, the bracket arms 64 are located slightly radially outwardly of transducer 60 at about 120 degree intervals around the perimeter thereof. Each bracket arm 64 has a generally L-shaped portion with one part being fastened to the outer surface of element 26 at a location radially outwardly of transducer 60 and extension 32. The radially outwardly disposed arm or tab can be fastened by a bolt and nut combination as shown in FIG. 1 or by other suitable means. The other part of the L-shaped portion, which extends at substantially a right angle to the other part, is a leg disposed generally parallel to the common longitudinal axis of housing 12 and reflector 44 and is spaced radially outwardly of the transducer 60. This part extends in an axial direction to a point adjacent the outer end face of transducer 60 whereupon it is formed in an inwardly extending end or termination. The inwardly extending end of each bracket 64 is provided with a body of material 68 which is of sufficient size so that the inner surface thereof is in contact with transducer 60 adjacent the outer annular end face thereof and the outer cylindrical surface of transducer 60 adjacent the end face thereof. The material 64 is of a type which will provide a cushioning or resilient type of mounting for the annular transducer 60. In addition, the material should be of a nature such that it does not absorb moisture and is readily attachable to the material of the bracket 64, which preferably is aluminum. One form of material 68 found to perform satisfactorily is 40 durometer neoprene rubber.

The mounting means for transducer 60 further comprises a plurality of mounting elements, each designated 70, and in the apparatus shown three elements are provided fixed to the supporting element 26 and located adjacent corresponding ones of the bracket arms 64. In particular, each element 70 is in the form of a body of suitable material fixed to the outer surface of element 26 and being of sufficient size such that it contacts transducer 60 at a location adjacent the inner end face of transducer 60 and the neighboring circumferential or peripheral surface portion of the transducer outer cylindrical surface. The material of elements 70 should be water resistant and have some resiliency to provide a cushioning mount for transducer 60. One form of material found to perform satisfactorily is commercially available 40 durometer neoprene rubber. The elements 70 are secured to the supporting element 26 in a suitable manner such as by adhesive or cement. One form of cement found to work satisfactorily is a 732 RTV silicone rubber cement commercially available from Dow Corning under the registered trademark Silastic.

The apparatus of the present invention further comprises second transducer means generally designated 74 and also carried by the supporting element 26. Transducer 74 has a natural frequency of oscillation and functions to provide output sound waves in the ultrasonic range when energized by an appropriate electrical signal in a manner which will be described in detail presently. Transducer 74 is in the form of a disc disposed in a plane generally perpendicular to the longitudinal axis of housing 12 and reflector 44 and is located within transducer 60. In particular, transducer 74 is positioned generally centrally of transducer 60 with the longitudinal axis thereof generally coincident with the common longitudinal axis of housing 12 and reflector 44. Transducer 74 is of the diaphragm type and is movably carried by element 26 in a manner allowing a limited degree of movement in an axial direction. The mounting means for transducer 74 comprises a disc-shaped element 76 of diameter slightly larger than that of transducer 74 and axial thickness less than that of transducer 74 having one surface thereof fixed to a surface of transducer 74 and having the opposite surface thereof fixed to the outer end surface 34 of the extension 32 of element 26. The mounting element 76 is of a suitable resilient material, for example rubber, which is fixed to transducer 74 and surface 36 by suitable means, for example the aforementioned silicone rubber cement.

The apparatus of the present invention further comprises driver means connected to the first and second transducers 60 and 74, respectively, for applying electrical signals to the transducer in a manner causing them to provide output sound waves in a manner which will be described. In the apparatus shown in FIG. 1, the driver means is represented diagramatically at 80 and is positioned within the housing 12. The driver means comprises appropriate electrical components and circuitry which will be described in detail presently, and as shown in FIG. 1 the electrical supply line 18 is connected to the driver means 80. The driver means 80 is attached to a supporting plate 82 which, in turn, is mounted in spaced relation to supporting element 26 by a plurality of spacer elements, one of which is designated 82, in combination with a bolt 84 received within the spacer element 82.

By way of illustration, in a typical device the outer maximum diameter of frusto-conical portion 22 is about 4.44 inches, the minimum outer diameter thereof is about 3.50 inches, and the diameter of cylindrical portion 16 is about 3.00 inches. The axial distance measured between end wall 14 and the outer edge of reflector 44 adjacent bead 48 is about 6.50 inches, the distance between surface 24 and the outer edge of reflector 44 is about 5.62 inches, and the distance from the junction of frustoconical wall 24 and reflector 44 to the outer edge of reflector 44 is about 2.62 inches. The maximum diameter of reflector 44 measured between the outer surfaces of bead 48 is about 12.62 inches. The inner surface of reflector 44 is defined by a portion of a sphere having a radius of about 8.00 inches. The supporting element or header has a diameter of about 4.25 inches measured on surface 28, a diameter of about 4.50 inches measured on the maximum diameter part of rim 30, and an axial length of about 0.38 inch. Portion 32 has an axial length of about 0.63 inch and a diameter of about 1.38 inch.

The electrical circuit of driver means 80 is illustrated in FIG. 3, and electrical power for operating the driver means is provided by a power supply connected to a standard 120 volt or 240 volt a.c. line. In particular, a conventional three prong plug 90 is connected by cable 18 through terminals designated 91–95 to the power supply. In the circuit shown, if a jumper wire is connected joining terminals 92 and 93 the system operates from a 240 volt line, and if jumper wires are connected joining terminals 91 and 93 and joining terminals 92 and 94 the circuit operates from a 120 volt line. Terminals 91–94 are connected to the primary winding of a transformer 96, and terminal 95 is the ground terminal. In particular, terminal 91 is connected through a fuse 98 to transformer terminal 99, and terminals 92–94 are connected to transformer primary terminals 100–102, respectively. The secondary winding of transformer 96 is connected by lines 103, 104 to a full wave diode bridge rectifier 106, the output of which is connected to one terminal of a capacitor 108, the other terminal which is connected to the circuit ground or reference. The series combination of a resistor 109 and capacitor 110 is connected across capacitor 108. The series combination of resistor 111 and Zenerdiode 112 is connected across capacitor 110. Another capacitor 113 is connected across diode 112. The power supply provides two output voltage levels on lines 114, 116, and in the circuit shown the output voltage on line 114 is about 50 volts positive and the output voltage on line 116 is about fifteen volts positive.

By way of illustration, in the circuit shown, transformer 96 is commercially available from the Signal Transformer Co. under the designation DPC-34-300, and rectifier 106 is commercially available under the designation Erie FWB 3001A. Capacitors 108 and 110 both have a magnitude of about 220 microfarads, and resistor 109 has a magnitude of about 27 ohms. Resistor 111 has a magnitude of about 1.5 kilohms, capacitor 113 has a magnitude of 33 microfarads, and diode 112 has a breakdown voltage of about 15 volts.

The transducers 60 and 74 are shown schematically in FIG. 3, and the driver means according to the present invention comprises oscillator means generally designated 120 and drivingly coupled to the transducer 60 for applying to transducer 60 an electrical signal having a frequency different from the natural frequency of transducer 60. In particular, oscillator 120 includes an integrated circuit timer 122 which in the present illustration is the commercially available Signetics NE555 timer. The various terminal pin numbers of that particular timer are indicated in FIG. 3. Terminal number 1 is connected to the circuit electrical ground or reference, and terminal number 8 is connected to line 116 which provides the voltage Vcc. The series combination of a fixed resistor 124 and a variable resistor or potentiometer 126 is connected between the terminals 7 and 8 in the manner shown. Terminals 2 and 6 are connected together, a capacitor 128 is connected between terminals 6 and 1, and a capacitor 130 is connected between terminals 1 and 5. Terminal number 1 also is connected to the circuit ground or reference. Terminal 4 is connected by a line 132 to other components of the driving means in a manner which will be described.

The terminal designated 3 of timer 122 is the output, and it is connected by a line 134 to one terminal of a resistor 136, the other terminal of which is connected to a power transistor designated 138 which is of the NPN type having base, collector, and emitter terminals 140, 142 and 144 respectively. The other terminal of resistor 136 is connected to base terminal 140, emitter terminal 144 is connected to the reference or ground, and a resistor 146 is connected across the base and emitter terminals. The collector terminal of transistor 142 is connected to one terminal of the transducer 60, and the other terminal of transducer 60 is connected to the circuit reference or ground. The collector terminal 142 also is connected through the series combination of an inductor 150 and resistor 152 to line 114 providing the V positive voltage. One form of transducer 60 found to perform satisfactorily is available commercially from Edel Western Corp. of Salt Lake City, Utah under the designation EC-64 and having a natural frequency of oscillation of about 20.5 kilohertz. The frequency of the oscillator output signal on line 134 is set by potentiometer 126 to be about 1–3 percent greater than the transducer natural frequency as will be described in detail presently.

The driver means further comprises oscillator means generally designated 160 drivingly coupled to the transducer 74 for applying to the transducer an electrical signal having a frequency different from the natural frequency of transducer 74. Oscillator 160 includes an integrated circuit timer 162 which, like timer 122, is of the Signetics NE555 type wherein the terminal pin numbers of that particular device are indicated in FIG. 3. Terminal number 8 is connected to line 116 supplying the voltage Vcc, and terminal 7 is connected through the series combination of a fixed resistor 164 and a variable resistor or potentiometer 166 to terminal 8. Terminals 2 and 6 are connected together, terminal 6 is connected through a capacitor 168 to terminal 1, and terminal 1 is connected through a capacitor 170 to terminal 5. Terminal number 1 also is connected to the circuit reference or ground. Terminal number 4 is connected by a line 172 to other components of the driving means in a manner which will be described. The output of timer 162 is on terminal number 3 which is connected by a line 174 to one terminal of a resistor 175, the other terminal of which is connected to a power transistor 176 having base, collector and emitter terminals 177, 178 and 179, respectively. Resistor 175 is connected to base terminal 177. Emitter terminal 179 is connected to the circuit reference or ground, and a protective diode 180 is connected between the base and emitter terminals. Diode 180 conducts any negative spike to ground and protects against negative overshoot. A resistor 173 is connected across diode 180. The collector terminal 178 of the transistor is connected by a line 181 to one terminal of transducer 74, and the other terminal of transducer 74 is connected to the circuit reference or ground. The collector terminal 178 also is connected through an inductor 180 to line 114 which provides the voltage V positive.

One form of transducer 74 found to perform satisfactorily is available commercially from Linden Laboratories under the designation P/N 70120-23 and having a natural frequency of oscillation of about 24.3 kilohertz. The frequency of the oscillator output signal on line 174 is set by potentiometer 166 to be about 1–3 percent greater than the transducer natural frequency as will be described in detail presently.

The driver means further includes timing means generally designated 184 connected in controlling relation to the oscillators 120 and 160 for controlling the duty cycle of the oscillators. In other words, timer 184 functions to turn the oscillators on and off at predetermined intervals. In particular, the timing means 184 functions like a switch to turn the oscillators 120 and 160 on and off at a regular rate whereby the output signals from the oscillators are applied to the transducers in a controlled on and off manner. The timing means 184 includes an integrated circuit timer device 186 which, like the devices 122 and 162, is the commercially available Signetics NE555 timer. The terminals of the device are numbered corresponding to that particular commercial timer. Terminal number 8 is connected to line 116 which supplies the voltage Vcc. Terminals 2 and 6 are connected together, and terminal 2 is connected through the series combination of fixed resistors 188 and 190 to terminal 8. Terminal number 7 is connected by line 192 to the junction of the resistors 188, 190. Terminal 6 is connected through a capacitor 194 to terminal 1, terminal 1 is connected through a capacitor 196 to terminal 5, and terminal 1 is connected to the circuit ground or reference. The output of timer 186 is on terminal 3 which is connected by lines 132 and 172 to timers 122 and 162, respectively. The frequency of the square wave output of timer 186 is determined by the values of capacitor 194 and resistors 188, 190.

By way of illustration, in the circuit shown, resistor 124 has a magnitude of 33 kilohms, resistor 126 is a 100 kilohm potentiometer, capacitor 128 has a magnitude of 390 picofarads, capacitor 130 has a magnitude of 0.01 microfarads, resistor 136 has a magnitude of 3.3 kilohms, resistor 146 has a magnitude of 1 kilohm, inductor 150 has a magnitude of 18 millihenries, and resistor 152 has a magnitude of 152 ohms. Resistor 164 has a magnitude of 33 kilohms, resistor 166 is a 100 kilohm potentiometer, capacitor 168 has a magnitude of 330 picofarads, capacitor 170 has a magnitude of 0.01 microfarads, resistor 173 has a magnitude of 1 kilohm, resistor 175 has a magnitude of 1.5 kilohms, and inductor 182 has a magnitude of 10 millihenries. Resistor 188 has a magnitude of 220 kilohms, resistor 190 has a magnitude of 100 kilohms, capacitor 194 has a magnitude of 10 microfarads, and capacitor 196 has a magnitude of 0.01 microfarad. The transducers 60 and 74 are of the piezoelectric crystal type and having a capacitive reactance depending upon the particular transducer resonant frequency. Voltage V plus has a magnitude of 50 volts.

The apparatus of FIGS. 1–3 operates in the following manner. One or more units of apparatus is installed in a room or area from which it is desired to repel and eliminate pests such as rodents. Each unit can be hung from a ceiling, mounted to a wall, or fixed to a supporting pole by any of various suitable brackets or mounting arrangements. Each unit is desposed to direct the output ultrasonic sound waves generally in the region of the ground or floor where the rodents and like pests normally travel. The apparatus is relatively small in size and light in weight and convenient to install in a variety of locations. The apparatus simply is plugged in or otherwise electrically connected to a standard 120 volt or 240 volt a.c. line in the manner previously described. Furthermore, the apparatus uses only about 40 watts of power and therefore is economical to operate. The grill 50 serves to preclude any electrical hazard by preventing human contact with the exposed transducers. The apparatus finds wide use in such locations as food warehouses, supermarkets, restaurants and feed mills to mention just a few.

As shown in FIG. 3, each transducer 60 and 74 is connected to the source of positive voltage +V when the corresponding power transistor 138 and 176, respectively, is turned off. The corresponding oscillators apply to the transistors square wave signals to turn the transistors off and on at substantially the oscillator signal frequency. As a result, the transducers 60 and 74 are driven or oscillated by these signals, and in accordance with the present invention the transducers are driven by signals having a frequency different from the natural frequency of the corresponding transducer. In particular, potentiometers 126 and 166 of the corresponding oscillators are set to apply square wave signals to transducers 60 and 74, respectively having a frequency about 1 to 3 percent greater than the natural oscillation frequency. The transducers are driven at frequencies above their natural frequencies to avoid producing output waves at a frequency less than about 20 kiloherz which is about the threshold frequency below which the effect on pests such as rodents may begin to be less effective. The resulting frequencies will never be below the transducer resonant or natural frequency which serves as a lower limit or stabilizer. In addition, timer 186 serves to turn the oscillators on and off at a predetermined rate, and according to a preferred mode of the present invention the oscillators are on about 60 percent of the time and off about 40 percent of the time under control of timer 184. In the circuit shown in FIG. 3, the output square wave from terminal 3 of timer 184 has a frequency of about 0.25 herz.

As a result of the foregoing, the apparatus of the present invention provides a composite output in the form of a random pattern of harmonics in the ultrasonic frequency range which is normally inaudible to humans and intolerable by pests such as rodents and the like. In particular, the provision of two transducers which most of the time will be providing output sound waves of slightly different frequencies will give rise to variations in amplitude known as beats. Each transducer, being driven at a frequency slightly greater than its natural frequency of oscillation will behave in a manner seeking or hunting for its natural frequency. This gives rise to a peaking effect as the transducer nears its natural or resonant frequency, and the foregoing is similar to the wowing phenomenon in broadcast communications where unstable frequencies give rise to variations in sound. Another illustration of the foregoing phenomenon is a mis-tuned radio receiver which is seeking or hunting the resonant frequency at which it normally would be tuned, the receiver cycling back and forth about the resonant frequency and exhibiting a momentary sharp increase or peaking of amplitude each time the natural frequency is reached momentarily. As each transducer hunts or seeks its natural or resonant frequency, but never stabilizing there, harmonics of the instautaneous transducer frequency also are produced. The random nature of the output pattern provided by the foregoing is furthered by the operation of timer 184 which turns the oscillators on and off at a predetermined rate. In addition, the provision of two transducers provides a relatively more potent noise level or amplitude, for example about 120 decibels as compared to about 90–95 decibels for a single transducer device.

The foregoing is enhanced by the mounting and relative locations of the transducers. The resilient or floating nature of the mounting of transducers 60 and 74 to supporting element 26 is believed to contribute to the peaking effect. Also, the location of the button or disc-shaped transducer 74 within the ring-shaped transducer 60 results in output vibrations from the center transducer driving the surrounding transducer which augments the foregoing random behavior. Positioning the outer end face of transducer 74 axially inwardly of the outer end face of transducer 60 a small distance, such as 1/16 inch, accentuates the foregoing. The central transducer 74, being of the diaphragm type, vibrates in an axial direction producing output vibrations in a relatively straight, concentrated outwardly extending beam or path. The ring transducer 60 vibrates in a radial direction producing an outwardly extending somewhat conical shaped pattern of sound waves guided by reflector 44 and interacting along the central axial region thereof with vibrations from the central transducer.

The square wave output signals on lines 134 and 174 from timers 122 and 162, respectively, purposely are not synchronized so as to contribute further to the foregoing random behavior. The inductors 150 and 182 connected to the transducers 60 and 74, respectively, shift the phase of the square wave signal applied to the transducer. The different magnitudes of resistors 136 and 175 were found to provide the best match to the capacitance of the respective transducers.

The ultrasonic sound waves produced by the apparatus of the present invention are normally inaudible to humans and intolerable by pests such as rodents and the like. The ultrasonic sounds are greatly disturbing and irritating to the rodents, repelling them from the vicinity of the apparatus thereby keeping them away from food, upsetting their mating habits and having a generally deleterious effect on their nervous systems. The apparatus of the present invention, having two transducers and characterized by the random output sound pattern, peaking, noise level increase and other attributes described hereinabove produces the foregoing effects on pests such as rodents and the like much more effectively than single transducer apparatus heretofore available. In addition, the random nature of the output ultrasonic waves produced by the apparatus of the present invention precludes the rodents from ever becoming accustomed to or developing tolerance for the ultrasonic output.

FIG. 4 illustrates an alternative transducer mounting arrangement for the apparatus of FIGS. 1-3. A supporting element 200, which performs the same function as element 26 in the embodiment of FIGS. 1 and 2, has a main body portion 202 which is planar, somewhat disc-shaped and which is formed to include a circumferential annular or rim or flange (not shown) in a manner similar to element 26 in FIGS. 1 and 2. Element 200 is formed to include a first cylindrical extension 204 which meets a radially inwardly extending surface portion 206 which, in turn, meets a second cylindrical extension 208 of diameter less than extension 204 which, in turn, meets a radially inwardly extending flange portion 210 having a central opening 212 therein. An annular or ring-shaped transducer 60', which is identical to transducer 60 of the embodiment of FIGS. 1-3, is mounted by means of an annular ring 216 of rubber material in a manner such that the transducer 60' is disposed with the longitudinal axis thereof generally coincident with the common longitudinal axis of the housing and reflector. The transducer 60' is located on the side of the supporting element 200 facing the reflector, and the transducer 60 is generally concentric with respect to the extension 208. The rubber ring 216 has an inner diameter substantially equal to the outer diameter of extension 208 and has an outer diameter slightly greater than that of the extension 204. The ring 216 is secured to the outer surface of the inwardly extending portion 206 by the aforementioned silicone rubber cement, and the opposite face of ring 216 is secured to the annular end face of transducer 60' by the same type of cement. As a result, the transducer 60' is movably carried by the supporting element 200 in a manner allowing a limited degree of movement in an axial direction. Ring 216 can be of the same rubber material as elements 70 shown in FIG. 1. The arrangement of FIG. 4 further includes a transducer 74' and mounting element 76' identical to the transducer and mounting element of the embodiment of FIGS. 1-3. The mounting element 76' is fixed to the outer surface of annular flange 210 by the aforementioned silicone rubber cement. As a result, transducer 74' is located within transducer 60', is disposed in a plane generally perpendicular to the common longitudinal axis of the housing and reflector, and is disposed with the longitudinal axis of the transducer being generally coincident with the common longitudinal axis of the housing and reflector. In addition, as in the embodiment of FIGS. 1-3, the outer surface of transducer 74' is located slightly radially inwardly of the outer axial end face of transducer 60'.

FIGS. 5 and 6 illustrate another alternative mounting arrangement for the transducers in the apparatus of FIG. 1. The arrangement includes a supporting element 200' which is identical to element 200 in the arrangement of FIG. 4. In this connection, the various parts of the supporting element are identified by the same reference numerals but provided with a prime designation. A ring-shaped transducer 60", identical to transducer 60', is secured at spaced circumferential locations by regions or quantities 214 of suitable cement, for example the aforementioned silicone rubber cement. In the arrangement shown, there are four regions of cement 214 at approximately 90° intervals around the circumference of ring 60". An illustrative distance between the end face of transducer 60" and the outer surface of radial flange 206' is about 0.030–0.040 inch. A transducer 74", substantially similar to transducer 74', can be mounted to flange portion 210 in a manner identical to that of the arrangement of FIG. 4. Alternatively, it can be mounted by spaced quantities or areas of cement 216 which in the arrangement shown are at 90° intervals around the circumference of the disc 74", the cement 216 being indentical to cement 214. As a result, the transducers 60" and 74" are carried by supporting element 200' in a manner providing a limited degree of axial movement of the transducers.

FIGS. 7-10 illustrate apparatus according to another embodiment of the present invention which is safely usable in explosive and inflammable atmospheres. The housing and reflector in the apparatus of this embodiment are identical to those of the embodiment of FIGS. 1-3 and, accordingly, are identified by the same reference numerals and having a prime designation. In addition, the apparatus of FIGS. 7-10 would be provided with a protective grill or guard (not shown) in a manner identical to that of the apparatus of FIGS. 1-3.

The apparatus of FIGS. 7-10 includes an element generally designated 220 which closes the interior of housing 12' and serves as a base or supporting means for other components of the system in a manner similar to that of the supporting element 26 in the embodiment of FIGS. 1-3. The element 220 includes a main body portion 222 which is planar, somewhat disc-shaped, and which is formed to include a circumferential annular rim or flange 224 having an outer surface shaped to conform to the inner surface of the frusto-conical wall 22' adjacent the opening thereof in which the element 220 is received. The element has a central opening, preferably circular, in the body portion 222.

The apparatus of this embodiment further comprises a single transducer means generally designated 228 which has a natural frequency of oscillation and functions to provide output sound waves in the ultrasonic range when energized by an appropriate electrical signal in a manner which will be described in detail presently. Transducer 228, like transducer 74 in the embodiment of FIGS. 1–3, is in the form of a disc and is of sufficient axial length such that a portion extends axially beyond the supporting element 220 in a direction toward the reflector 44' and a portion portion thereof extends axially inwardly of supporting element 220 into the interior of the housing 12'. Transducer 228 is of the diaphragm type with the sensitive surface thereof facing outwardly toward the reflector region 44'. In the apparatus shown, the transducer 228 is provided with a relatively thin backing plate or base 230, preferably of metal. Transducer 228 extends through the central opening in supporting element 220, the backing element 230 is located within the interior of housing 12' and disposed generally parallel to the body portion 222 of supporting element 220, and a sealing means in the form of an O-ring 232 is positioned between the inner surface of body portion 222 and the surface of plate 230 facing surface 222. O-ring 232 has an inner diameter substantially equal to the outer diameter of transducer 228 and serves to provide a gas-tight seal between transducer 228 and supporting element 220 whereby the interior of housing 12' is sealed in gas-tight relationship to the external environment. The combination of transducer 228 and backing plate 230 is held in fixed relation to the supporting element 220 by means of a plurality of fastening arrangements including a rubber grommet 234, bolt 236, washer 238 and nut 240. As shown in FIG. 8, the backing plate 230 is generally triangular-shaped, and there are three fastening arrangements each located at an apex of the triangle.

The apparatus of FIG. 7–10 further comprises driver means connected to the transducer 228 for applying an electrical signal to the transducer in a manner causing it to provide output ultrasonic sound waves in a manner which will be described. The driver means is shown diagrammatically at 244 and is positioned within the housing 12'. The driver means comprises appropriate electrical components and circuitry which will be described in detail presently. As shown in FIG. 7, the driver means is attached to a supporting plate 246 which, in turn, is mounted in spaced relation to the supporting element 220 by a plurality of spacer elements, one of which is designated 248, in combination with a bolt 250 received in the spacer element. As shown in FIG. 8, the backing plate 230 is provided with a central opening 252 to facilitate making electrical connections to the transducer 228.

Electrical power for operating driver means 244 is supplied by means of a cable extending into housing 12' in a manner similar to that of the embodiment of FIGS. 1–3, and FIG. 10 shows an arrangement for sealing or isolating a cable designated 18' from the atmosphere or environment. Cable 18' extends through an opening in the housing end wall 14', and a bushing-like element 254 extends through the opening in concentric relation with the cable 18'. The element 254 has a radially outwardly extending rim which engages the inner surface of wall 14' and carries an O-ring 256 for sealing against that surface. The portion of element 254 extending outwardly of the wall 14' is externally threaded to receive an internally threaded bushing element 258 which is connected on the bushing 254 and carries an O-ring 260 for sealing against the outer surface of wall 14'. The element 258 likewise is in concentric relation with cable 18' and carries a sealing element 262 therein which firmly embraces the cable 18'. A conduit 264 which contains cable 18' is threaded into the end of the element 258. As a result, all electrical parts of the apparatus including conduit 18', driver means 244 and the connection of driver 244 to transducer 228 are isolated or sealed in gas-tight relation to the external environment. As a result, the apparatus is safely usable in explosive and flammable atmospheres which are encountered in some industrial establishments.

FIG. 11 shows the circuit and components of driver means 244 for transistor 228, and the driver means is operated from a power supply which can be identical to the power supply shown in FIG. 3. In this connection, the lines 114' and 116' in the circuit of FIG. 11 would be connected to the lines 114 and 116, respectively, of the power supply of FIG. 3. The circuit of FIG. 11 includes oscillator means generally designated 270 drivingly coupled to the transducer 228 for applying to the transducer an electrical signal having a frequency different from the natural or resonant frequency of oscillation of the transducer 228. In particular, oscillator 270 includes an integrated circuit timer 272, which in the present example is the commercially available Signetics NE555 timer, and the various terminal pin numbers of that particular timer are indicated in FIG. 11. Terminal number 8 is connected by a line 274 to line 116' which provides the voltage Vcc. The series combination of a fixed resistor 276 and a variable resistor or potentiometer 278 are connected between the terminals 7 and 8, and the junction of the resistors is connected by a line 280 to the terminal number 2. Terminal 2 also is connected to terminal 6, which, in turn, is connected by a capacitor 282 to the circuit ground or reference point. Terminal 1 is connected by a line 284 to the circuit ground or reference point, and terminal 5 is connected through a capacitor 286 to the circuit reference point. Terminal 4 is connected by a line 288 to another component of driving means in a manner which will be described. The terminal designated 3 of the timer 272 is the output and it is connected to one terminal of a resistor 292, the other terminal of which is connected to a power transistor designated 294 which is of the NPN type having base, collector and emitter terminals 296, 298 and 300, respectively. The other terminal of resistor 292 is connected to base terminal 296 and also is connected through the parallel combination of a resistor 302 and a protective diode 304 to the circuit ground or reference point. Emitter terminal 300 also is connected to the ground. The collector terminal 298 of transistor 294 is connected to one terminal of the transducer 228, the other terminal of which is connected to the circuit ground. The collector terminal also is connected through an inductor 308 to line 114' providing the V positive voltage.

The driver means further includes timing means generally designated 310 connected in controlling relation to the oscillator 270 for controlling the oscillator duty cycle. In particular, the timing means 310 functions like a switch to turn the oscillator 270 on and off at a regular rate whereby the output signal from the oscillator is applied to the transducer in a controlled on and off manner. The timing means 310 includes an integrated circuit timer device 312 which, like the device 272, is the commercially available Signetics NE555 timer. The terminals of the device are numbered corresponding to those of that commercially identified timer. Terminal number 8 is connected by a line 314 to the line 166' which supplies the voltage Vcc. The terminals 4 and 8 are connected together by a line 316. Terminal number 2 is connected to terminal 8 through the series combination of fixed resistors 318 and 320 and line 314. The junction of resistors 318, 320 is connected by a line 322 to the terminal 7. Terminals 2 and 6 are connected together and terminal 6, in turn, is connected through a capacitor 324 to the circuit ground or reference point. Terminal 1 is connected through a line 326 to the circuit ground or reference point, and terminal 5 is connected through a capacitor 328 to the circuit ground or reference point. The output terminal 3 is connected by line 288 to the oscillator 270.

By way of illustration, in the circuit shown, transducer 228 is of the piezoelectric crystal type having a capacitive reactance depending upon the transducer resonant frequency. One transducer found to perform satisfactorily is commercially available from Linden Laboratories under the designation P/N 70140 having a resonant frequency of about 24.6 kiloherz. Resistor 276 has a magnitude of 33 kilohms, resistor 278 is a 100 kilohm potentiometer, capacitor 282 has a magnitude of 330 picofarads, capacitor 286 has a magnitude of 0.01 microfarads, resistor 292 has a magnitude of 1.5 kilohms, resistor 302 has a magnitude of 1 kilohm, and inductor 308 has a magnitude of 10.5 millihenries. Resistor 318 has a magnitude of 220 kilohms, resistor 320 has a magnitude of 100 kilohms, capacitor 324 has a magnitude of 10 microfarads and capacitor 328 has a magnitude of 0.01 microfarads.

The apparatus of FIG. 11 operates in the following manner. Potentiometer 278 is set so that oscillator 270 drives transducer 228 through transistor 294 at a frequency about 1–3 percent greater than the natural or resonant frequency of transducer 228 in a manner similar to the circuit of FIG. 3. As a result, there is a peaking in the ultrasonic output as transducer 228 hunts or seeks its natural frequency as explained in connection with FIG. 3. The effect of this frequency hunting and peaking is enhanced by the operation of timer 310 which causes oscillator 270 to be on 60 percent of the time and off 40 percent of the time. In this connection, the square wave output on line 288 has a frequency of about 0.25 herz. The output ultrasonic waves are normally inaudible to humans and intolerable by pests such as rodents and the like. Thus, the apparatus of FIGS. 7–11 is both highly effective in repelling pests such as rodents and usable in explosive and inflammable atmospheres.

FIG. 12 illustrates a system comprising a plurality of units of apparatus according to the present invention. In the diagrammatic plan view of FIG. 12, a pair of identical units of apparatus 336a, 336b are supported by a vertically disposed rod 338 or suitable support. Each unit 336a, 336b is fixed by suitable means adjacent the housing end wall to support 338, the units are located an appropriate distance such as 2–3 feet above the floor or ground to which support 338 is fixed, and in the system shown the units 336a, 336b are oppositely directed, i.e. oriented in directions 180° apart. The system of FIG. 12 further includes another pair of identical apparatus units 336c, 336d supported by a vertically disposed rod 340 or support in a manner similar to the other pair of units. The units 336c, 336d are oppositely directed in a manner similar to the other units, and are located above the ground or floor the same vertical distance as units 336c, 336d so that all four units are in horizontal alignment. In addition, the units 336a, 336c are in face-to-face or opposed alignment, i.e. the radiator or reflector of unit 336a faces the radiator or reflector of unit 336c. Units 336a, 336c are spaced apart an appropriate horizontal distance, and these two units as well as the other two units 336b, 336d have a common longitudinal axis 342.

The two units 336a, 336c thus are in spaced apart alignment so that the sound waves of one unit work against or oppose the sound waves of the other unit. When units 336a, 336c are of the type shown and described in conjunction with FIGS. 1–3, in the region between the two units there is a maximizing of the effects of the large number of frequencies, random pattern of harmonies and amplitude peaking effects provided by the units. This is especially irritating and harmful to the rodents and similar pests and therefore highly effective in repelling them. In addition, the resulting output pattern has significant strength in directions perpendicular to the common longitudinal axis 342 of the units. For example, if the distance between units 336a, 336c measured along axis 342 is 30 feet, a significant level of output sound waves will be present about seventy five feet in either perpendicular direction from axis 342 along the mid point between the units.

FIG. 13 illustrates the manner in which a plurality of units of apparatus according to the present invention can be nested together for convenience in storage and shipment. As shown in FIG. 1, transducers 60, 74 and driving means 80 are mounted to supporting element 26 which is removably attached to housing 12 by means of a plurality of fasteners such as screw 40. During storage and shipment, the subassembly consisting of element 26, transducers 60, 74 and driving means 80 can be removed from and stored or located separately of housing 12. Cord 18 is of course readily detachable from component 80 if necessary. Grill 50 is removed from reflector 44. A plurality of housing-reflector subassemblies then can be nested together due to the frusto-conical shape of housing wall 22 and the shape of the reflector 44. As shown in FIG. 13, a first subassembly 350a consisting of housing 352a and reflector 354a is nested over a second subassembly 350b consisting of housing 352b and reflector 354b. The frustoconical housing 352b fits relatively closely within frustoconical housing 352a and reflector 354b fits relatively closely within reflector 354a. The grills or guards 356a, 356b are inverted and placed within the innermost reflector 354b. Thus, the nested arrangement of subassemblies occupies considerably less space as compared to arranging the parts separately, and the transducer-driver subassemblies can be located at a convenient place in the container or storage area. The foregoing allows a relatively large number of apparatus units to be stored and transported in a relatively small amount of space, and this also is applicable to the form of apparatus shown in FIGS. 7–10.

It is therefore apparent that the present invention accomplishes its intended objects. While several embodiments of the present invention have been described in detail, this is for the purpose of illustration, not limitation.

I claim:

1. Apparatus for generating and radiating ultrasonic sound waves for the control of pests comprising:

(a) supporting means;

(b) sound generating means carried by said supporting means and comprising first and second transducer means for providing sound waves when driven by corresponding electrical signals, each of said first and second transducer means having a natural frequency of oscillation, said sound waves being at frequencies normally inaudible to humans and intolerable by pests as rodents and the like, and driver means connected to said first and second transducer means for applying electrical signals to said first and second transducer means in a manner causing said first and second transducer means each to seek the natural frequency of oscillation thereof but never to stabilize at such natural frequencies so as to provide a composite output in the form of an unstable pattern of frequencies and amplitude peaking in the ultrasonic frequency range; and (c) a reflector extending from said supporting means and positioned relative to said first and second transducer means in a manner providing directional concentration of said output waves.

2. Apparatus according to claim 1, further including means for mounting said first and second transducer means in a manner providing a limited degree of movement between said first and second transducer means and said supporting means to contribute to said amplitude peaking in the ultrasonic frequency range.

3. Apparatus according to claim 1, wherein said first and second transducer means each has a generally circular peripheral shape, said first and second transducer means being in a generally concentric relation, whereby output vibrations from the central transducer influence the outer transducer in a manner augmenting the unstable pattern of frequencies.

4. In combination with the apparatus of claim 1, another identical apparatus thereby providing a system comprising two units of said apparatus, said units being spaced apart and disposed in opposed alignment with the reflector of one unit facing the reflector of the other unit in a manner such that the ultrasonic sound waves generated and radiated from one unit work against the ultrasonic sound waves generated and radiated by the other unit.

5. Apparatus according to claim 1 further including a housing extending from said reflector, said housing being generally frustoconical in shape, said reflector being generally dish-shaped, said supporting means comprising a generally disc-shaped element removably connected to said housing, whereby a subassembly comprising said supporting element, first and second transducer means and driver means can be removed thereby leaving another subassembly comprising said reflector and said housing and whereby a plurality of housing-reflector subassemblies can be nested together and a corresponding plurality of supporting element subassemblies can be located separately therefrom during storage and shipment of a number of units of said apparatus.

6. Apparatus for generating and radiating ultrasonic sound waves for the control of pests comprising:
(a) supporting means;
(b) a transducer carried by said supporting means having a natural frequency of oscillation for providing sound waves when driven by an electrical signal, said sound waves being at frequencies normally inaudible to humans and intolerable by pests such as rodents and the like;

(c) oscillator means carried by said supporting means and drivingly coupled to said transducer for applying to said transducer an electrical signal having a frequency different from the natural frequency of said transducer; and
(d) a reflector extending from said supporting means and positioned relative to said transducer in a manner providing directional concentration of said sound waves.

7. Apparatus according to claim 6, further including timing means connected in controlling relation to said oscillator means for switching said oscillator means on and off at a controlled rate.

8. Apparatus according to claim 6 further including a housing extending from said reflector and defining an interior, said supporting means comprising an element associated with said housing and closing the interior thereof, said element having an opening therethrough, said transducer extending through said opening in said supporting element, and means for providing a gas-tight seal between said transducer and said supporting element in a manner sealing closed said interior of said housing.

9. Apparatus according to claim 8 wherein said transducer is generally disc-shaped having an axial length such that portions of said transducer are on opposite sides of said supporting element and wherein said sealing means comprises an O-ring carried by said transducer and sealingly contacting said transducer and the side of said supporting element facing said housing interior.

10. In combination with the apparatus of claim 6, another identical apparatus thereby providing a system comprising two units of said apparatus, said units being spaced apart and disposed in opposed alignment with the reflector of one unit facing the reflector of the other unit in a manner such that the ultrasonic sound waves generated and radiated from one unit work against the ultrasonic sound waves generated and radiated by the other unit.

11. Apparatus according to claim 6 further including a housing extending from said reflector, said housing being generally frustoconical in shape, said reflector being generally dish-shaped, said supporting means comprising a generally disc-shaped element removably connected to said housing, whereby a subassembly comprising said supporting element, transducer and oscillator can be removed thereby leaving another subassembly comprising said reflector and said housing and whereby a plurality of housing-reflector subassemblies can be nested together and a corresponding plurality of supporting element subassemblies can be located separately therefrom during storage and shipment of a number of units of said apparatus.

12. Apparatus for generating and radiating ultrasonic sound waves for control of pests comprising:
(a) supporting means;
(b) sound generating means carried by said supporting means and comprising first and second transducer means for providing sound waves when driven by corresponding electrical signals, each of said first and second transducer means having a natural frequency of oscillation, said sound waves being at frequencies normally inaudible to humans and intolerable by pests such as rodents and the like, and driver means connected to said first and second transducer means for applying electrical signals to said first and second transducer means in a manner causing said first and second transducer means to provide a composite output in the form of an unstable pattern of frequencies and amplitude peaking in the ultrasonic frequency range, said driver means comprising first oscillator means drivingly coupled to said first transducer means for applying to said transducer an electrical signal having a frequency different from the natural frequency of said first transducer means and second oscillator means drivingly coupled to said second transducer means for applying to said transducer an electrical signal having a frequency different from the natural frequency of said second transducer means; and (c) a reflector extending from said supporting means and positioned relative to said first and second transducer means in a manner providing directional concentration of said output waves.

13. Apparatus according to claim 12, wherein said driver means further includes timing means connected in controlling relation to said first and second oscillator means for switching said first and second oscillator means on and off at a predetermined rate.

14. Apparatus according to claim 12, further including means for mounting said first and second transducer means in a manner providing a limited degree of movement between said first and second transducer means and said supporting means.

15. Apparatus according to claim 12, wherein said first and second transducer means each has a generally circular peripheral shape, said first and second transducer means being in generally concentric relation.

16. Apparatus for generating and radiating ultrasonic sound waves for the control of pests comprising:
(a) supporting means;
(b) sound generating means carried by said supporting means and comprising first and second transducer means for providing sound waves when driven by corresponding electrical signals, said sound waves being at frequencies normally inaudible to humans and intolerable by pests such as rodents and the like, and driver means connected to said first and second transducer means for applying electrical signals to said first and second transducer means in a manner causing the first and second transducer means to provide a composite output in the form of an unstable pattern of frequencies and amplitude peaking in the ultrasonic frequency range, said first and second transducer means each having a generally circular peripheral shape, said first and second transducer means being in generally concentric relation, one of said transducers means being generally annular in shape and the other of said transducer means being generally disc-shaped and positioned within said one transducer means; and (c) a reflector extending from said supporting means and positioned relative to said first and second transducer means in a manner providing directional concentration of said output waves.

17. Apparatus according to claim 16, wherein each of said transducer means has an outer axial end surface generally facing the region of said reflector, said end surface of said disc-shaped transducer means being located axially inwardly of said end surface of said annular shaped transducer means.

18. Apparatus for generating and radiating ultrasonic sound waves for the control of pests comprising:
(a) supporting means;
(b) sound generating means carried by said supporting means and comprising first and second transducer means for providing sound waves when driven by corresponding electrical signals, said sound waves being at frequencies normally inaudible to humans and intolerable by pests such as rodents and the like, said first transducer means being in the form of a ring having a natural frequency of oscillation, said second transducer means being in the form of a disc having a natural frequency of oscillation, said second transducer means being positioned within said first transducer means, and driver means connected to said first and second transducer means for applying electrical signals to said first and second transducer means in a manner causing said first and second transducer means to provide a composite output in the form of an unstable pattern of frequencies and amplitude peaking in the ultrasonic frequency range, said driving means including a first oscillator for applying to said first transducer means an electrical signal having a frequency different from the natural frequency of said first transducer means, a second oscillator for applying to said second transducer means an electrical signal having a frequency different from the natural frequency of said second transducer means, and timer means connected in controlling relation to said first and second oscillators for switching said oscillators on and off at a predetermined rate; and (c) a reflector extending from said supporting means and positioned relative to said first and second transducer means in a manner providing directional concentration of said output waves.

19. Apparatus according to claim 18 further including first and second mounting means for mounting said first and second transducers, respectively, in a manner allowing a limited degree of movement between said first and second transducer means and said supporting means.

* * * * *